United States Patent

[11] 3,538,866

| [72] | Inventor | Floyd C. Gaines<br>Grapevine, Texas |
|---|---|---|
| [21] | Appl. No. | 697,551 |
| [22] | Filed | Dec. 21, 1967 |
| [45] | Patented | Nov. 10, 1970 |
| [73] | Assignee | Pan American Hydroponics, Inc.<br>Grapevine, Texas<br>a corporation of Texas |

[54] DISPENSER FOR FUMIGANTS AND METHOD OF APPLYING SAME
1 Claim, 3 Drawing Figs.

[52] U.S. Cl. ................................................. 111/6,
248/146, 222/83.5, 239/309, 43/129, 222/5
[51] Int. Cl. ..................................................... A01n 7/04,
B67b 7/24, A01m 13/00, A01m 17/00
[50] Field of Search............................................ 43/129;
47/1, 1—2, 58; 111/6; 222/80, 83.5, 88;
239/271—2, 309; 21/108—9; 248/146

[56] References Cited
UNITED STATES PATENTS

| 1,323,918 | 12/1919 | Seraphine..................... | 43/129 |
| 2,536,221 | 1/1951 | Rector et al. ................. | 222/88 |
| 2,984,939 | 5/1961 | Russell .......................... | 47/58 |
| 3,166,096 | 1/1965 | Lang ............................ | 239/309 |

Primary Examiner—Robert E. Bagwill
Attorney—Howard E. Moore

ABSTRACT: A dispenser and method of applying fumigants including an evaporating tray with upstanding guide members spaced around the walls thereof and a perforating pin centrally located therein for perforating the fumigant cannister when a downward force is exerted upon a cover disposed over the cannister, preventing manual contact with and release of fumigants in undesired areas.

Patented Nov. 10, 1970
3,538,866
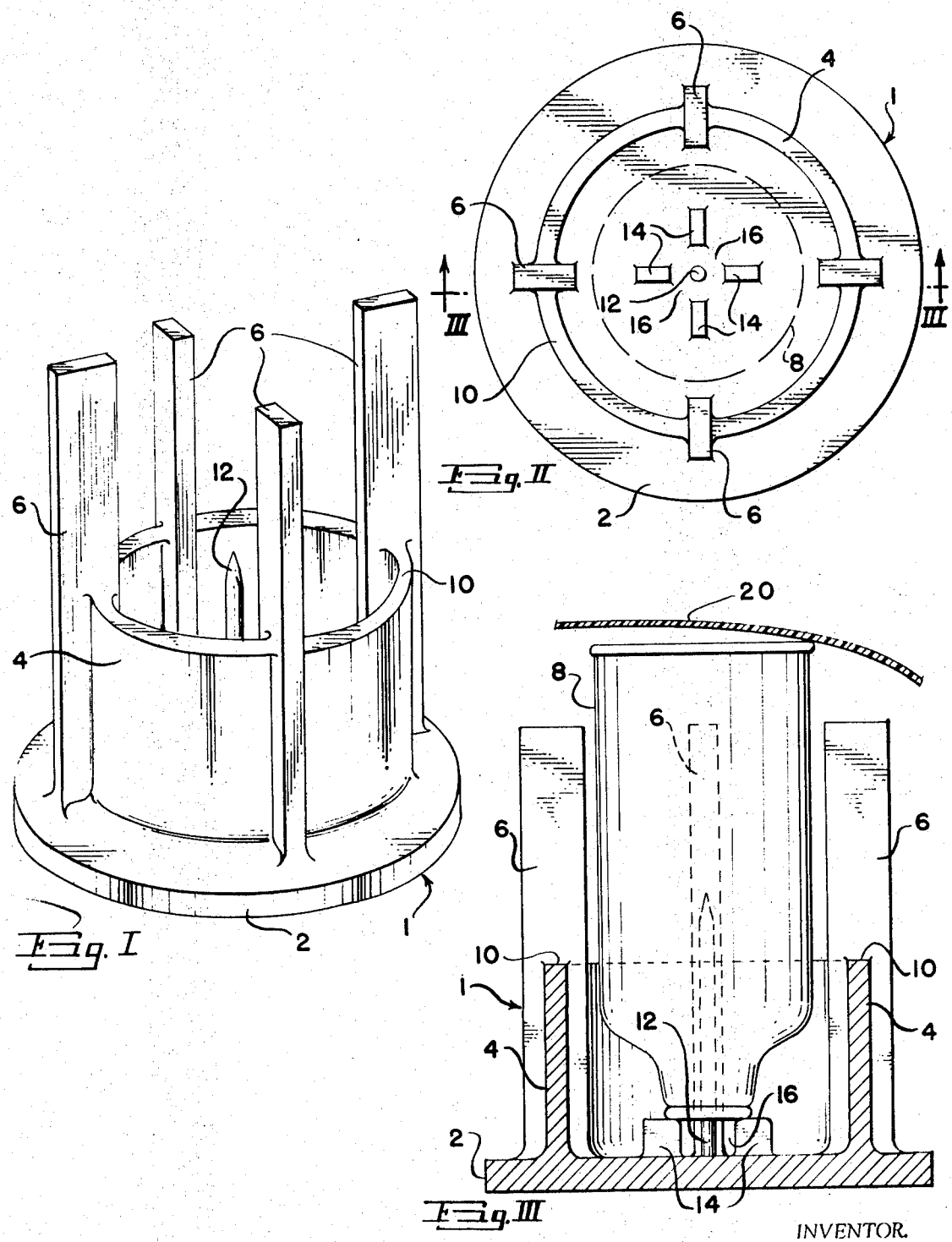
INVENTOR.
FLOYD C. GAINES, JR.
BY Howard E. Moore
ATTORNEY

DISPENSER FOR FUMIGANTS AND METHOD OF APPLYING SAME

BACKGROUND OF INVENTION

Fumigants such as methyl bromide are commonly used in the sterilization of hydroponic beds, soil fumigation and the fumigation of structures structures such as warehouses, freight cars, and the like to kill all living organisms therein. Fumigants such as methyl bromides, if used properly, have no harmful effect on foodstuffs or other produce, however extreme caution must be exercised in applying the fumigant because the fumes thereof are deadly poison.

While the device herein described can be used with many types of fumigants which are used for numerous purposes the description of the present invention will be limited to the use of methyl bromide plus 2 percent chloropicrin for the sterilization of hydroponic plant beds.

The term "hydroponics" refers to the basic techniques of growing plants without soil. Plants grown hydroponically are grown in trays or troughs constructed of inert material such as fiberglass filled with gravel and the plants are placed in this supporting medium with the roots being flooded from below at intervals with a water solution containing salts of all the elements known to be essential for proper plant growth.

Optimum conditions of temperature, humidity, etc., are maintained in the greenhouse at all stages of plant growth in an effort to achieve maximum growth and production from the plants. It is therefore essential that the plant beds be sterilized prior to setting out plants to eliminate nematodes, weeds and grass seeds, tobacco mosaic virus and other viruses and fungi and disease bearing bacteria in the plant beds. Fumigation is generally achieved by covering the plant beds with a gas-proof polyethylene cover which is sealed around the edges by covering the edges thereof with soil or sealing with tape the edges of the cover to the floor. Numerous dispensing devices or applicators have been used heretofore to inject the fumigant under the cover which use complicated elaborate structure. All of these devices require the canister containing the fumigant to be maintained outside of the gas-proof cover and the handling of the container and applicator containing the deadly poisonous fumigant while the fumigant is being dispensed.

Methyl dioxide is an odorless, highly volatile deadly gas, and methyl bromide in gaseous state is extremely hazardous and humans must not breathe these vapors nor allow it to come into contact with the eyes, the skin or the clothing.

These gases are normally packaged in and dispensed from pressure cans which must be punctured prior to using.

The use of present applicators and dispensing devices are hazardous because the canister must be held in the hands and disposed outside of the gas-proof cover when the canister is being punctured and while it is being dispensed, producing the hazard of accidentally dropping a punctured can or otherwise allowing the fumigant to be deposited on or breathed by personnel.

SUMMARY OF THE INVENTION

The primary object of the present invention is to provide a dispensing device for fumigants such as methyl bromide which may be placed under a gas-proof cover prior to perforating the canister containing the fumigant thereby eliminating danger of the deadly gas coming into contact with the skin or clothing of personnel or breathing same.

A further object of the present invention is to provide a dispenser for fumigants of simple construction with no moving parts whereby use is simple and foolproof and maintenance is virtually nonexistent.

A further object of the present invention is to provide a dispenser for fumigants with an evaporating tray with a capacity which exceeds that of the fumigant canister eliminating the possibility of overflow in case the fumigant is used at a temperature below its boiling point.

A further object of the present invention is to provide a dispenser which is durable and easily stored.

Another object of the present invention is to provide a dispenser of versatile construction which may be used in all known methods of fumigation.

A general object of the invention is to provide a fumigant dispenser which is safe and positively prevents escape of noxious gases into undesired areas while being dispensed.

These and further objects will be apparent from the specification, drawings and claims hereinafter following.

DESCRIPTION OF THE DRAWINGS

The accompanying drawings of the present invention are provided so that the invention may be better and more fully understood, in which:

FIG. I is a perspective view of the dispenser incorporating the invention;

FIG. II is a plan view of the dispenser with a canister shown by dashed lines; and FIG. III is a cross-sectional elevational view taken substantially along lines III–III of FIG. II looking in the direction indicated by the arrows.

Numeral references are employed to indicate the various parts as shown in the drawing and like numerals indicate like parts throughout the various FIGS. of the drawing.

DESCRIPTION OF A PREFERRED EMBODIMENT

Referring to FIG. I of the drawing, the numeral 1 generally designates a dispenser for fumigants. The dispenser 1 consists of a base 2 with upturned walls 4 forming a container or evaporating tray of a capacity exceeding that of a canister of fumigants which is to be dispensed. A plurality of upstanding guide members 6 are spaced around the upper periphery of the evaporating tray formed by the upstanding walls 4. Guide members 6 are positioned to complementarily receive and maintain a fumigant canister in an upright position. The guide members 6 extend into the evaporating tray through the walls 4 a sufficient distance to provide spacers to the canister from contacting the top 10 of the wall 4 thereby providing an annular space for evaporation of fumigant.

A perforating pin 12 is centrally located within the evaporating tray and extends upwardly substantially perpendicular to the base 2 of the dispenser 1.

Support members 14 are radially disposed in spaced apart relation around the perforating pin 12 extending upwardly from base 2 to form a support for the canister 8 to prevent closure of the canister 8 by contact with base 2 of the dispenser 1. Openings 16 are formed between the supports 14 to facilitate diffusion of the fumigant into the evaporating tray and consequently into the atmosphere under the gas-proof cover 20.

OPERATION

After all plants have been removed from the greenhouse and as much of the root system from the beds as is practical, the interior of the building and the hydroponic beds and sumps are sprayed with tap water. The hydroponic beds should be moist during fumigation for best results, and the temperature must be maintained above the boiling point of the fumigant. After the bed has been moistened a fumigant dispenser 1 is placed on the surface of the gravel hydroponic bed of each trough. A fumigant canister 8 is placed in the dispenser between guide members 6 with end wall of the canister resting upon the point of the perforating pin 12. Cover supports and spacers of any material such as empty burlap bags, empty tin cans, bottles, or sticks are then spaced over the gravel area to be covered. The gas-proof cover 20 is then placed over the dispensers and the cover supports forming small tents throughout the area of the surface to be sterilized or fumigated. The cover 20 is preferably made of impervious nonporous, gas-proof material such as a polyethylene plastic sheet. A gas-proof seal is then created by placing the outer edges of the gas-proof cover in trenches and covering them with gravel or by taping the outer edges to a concrete floor where available, thereby confining substantially all fumes under the cover.

After area has been prepared as described above, a downward force upon the gas-proof cover 20 on the canister at the location of each dispenser 1 will force the perforating pin 12 through the end of the canister 8 allowing the fumigant to escape through openings 16 between the support member 14 and consequently to diffuse into the atmosphere confined beneath the gas-proof cover 20. This is done without manually handling or coming into contact with the canister and without exposing personnel to the contents thereof.

The evaporating tray formed by upturned walls 4 has a capacity which exceeds that of the fumigant canister eliminating the possibility of overflow in case the fumigant is used at a temperature below the boiling point thereof resulting in a discharge of the fumigant in liquid state. Since the liquid fumigant is contained, it may be safely evaporated or the unevaporated portion removed and will not soak into the gravel to later evaporate creating a deadly hazard. Methyl bromide has a boiling point of 38.5°F. and should not be used below that temperature.

It will be understood that other and further embodiments of my invention may be made without departing from the spirit and scope of the appended claims.

I claim:
1. A dispenser holder for fumigants from a canister under a sheet of material disposed thereover comprising, an evaporating tray having a bottom and an upwardly extending wall therearound; a perforating pin centrally secured in the evaporating tray and extending upwardly from the bottom thereof; a plurality of spaced support members on the bottom of the evaporating tray forming a plurality of passages between the support members, said support members extending upwardly from the bottom of the evaporating tray a distance less than the distance from the bottom of the tray to the upper end of the perforating pin, and annularly arranged about said pin to space a canister vertically from the bottom of the tray; a plurality of spaced guide members extending upwardly from the upper edge of the wall of the tray forming a plurality of openings between the guide members to maintain a flexible cover of sheet material in spaced relation from the upper edge of the wall of the tray; and a plurality of spaced spacer members extending inwardly from the wall into the evaporating tray to space a canister horizontally from the wall of the tray.